2,809,987
Patented Oct. 15, 1957

2,809,987

PREPARATION OF ACRYLONITRILE AND ETHYLENE

William L. Fierce, Crystal Lake, and Walter J. Sandner, Carpentersville, Ill., assignors to The Pure Oil Company, Chicago, Ill., a corporation of Ohio No Drawing. Application March 30, 1956, Serial No. 574,994

10 Claims. (Cl. 260—465.3)

This invention relates to the preparation of acrylonitrile and ethylene and is more particularly concerned with a process for reacting ethane and cyanogen to form ethylene and acrylonitrile.

In our application Serial No. 555,772, filed December 28, 1955, we disclose a method for preparing acrylonitrile by reaction of cyanogen and ethylene or other olefin. We have now discovered that it is not necessary to start with an olefin in order to make acrylonitrile by reaction with cyanogen. Greater yields of acrylonitrile can be obtained if ethane is used as the starting material and high yields of ethylene can be obtained in the same reaction. As a result, two valuable products are obtained from the reaction, namely, the acrylonitrile which has wide use in the preparation of acrylopolymers and resins, acrylic plastics and in the preparation of nitrile rubber; and ethylene which is a starting point for the synthesis of a number of organic chemicals, such as ethylene oxide and ethylene glycol, and for the preparation of polyethylene which has wide use as a plastic.

It is an object of our invention to provide a method for preparing acrylonitrile.

Another object of our invention is to provide a method for preparing ethylene.

A still further object of the invention is to provide a method for simultaneously producing acrylonitrile and ethylene by reaction of ethane and cyanogen.

In accordance with our process, ethane is reacted with cyanogen at temperatures of 700° C. and above. Temperatures as high as 1000° C. may be used but we prefer to operate at temperatures of about 750–850 or 900° C. The process may be conducted at atmospheric pressure or it may be carried out at super-atmospheric pressure or sub-atmospheric pressure. The ethane and cyanogen may be premixed or charged separately to the reaction zone in a preferred mol ratio of 1 to 10 mols of ethane to 1 mol of cyanogen. Ratios of ethane to cyanogen may vary from 1 to 20 of the former to 20 to 1 of the latter.

Reaction proceeds without the aid of catalysts. Heat may be supplied by any conventional means as, for example, a pebble heater. Reaction velocities are relatively high and are preferably in the vicinity of 200 to 1000 gaseous hourly space velocity, although space velocities between 100 and 2000 give useful amounts of the desired reaction products. The reaction products may be separated by means of a suitable condenser and refrigerating apparatus. If desired, the reaction effluent may be recycled either before or after separation of the acrylonitrile in order to utilize the unreacted portion of the effluent or to increase the nitrile content to a desired level. It will be apparent that the process may be run as a batch, intermittent or continuous process.

One of the products of reaction between the ethane and cyanogen is hydrocyanic acid. Hydrocyanic acid may be separated from the effluent gas and utilized as such, or in the preparation of cyanide salts, but preferably the hydrogen cyanide is converted back to cyanogen, either by reaction with oxygen in the presence of a silver catalyst or by reaction with nitrogen dioxide at elevated temperatures, preferably in the presence of a catalyst, such as lime glass beads or silver, as disclosed in our co-pending application Serial No. 553,428. The amount of cyanogen recovered from the hydrogen cyanide is insufficient to maintain the desired yield of acrylonitrile and, therefore, must be supplemented by additional sources of cyanogen prepared in any suitable manner as, for example, the reaction of potassium cyanide and copper sulfate; the reaction of oxygen and hydrogen cyanide over silver catalyst; or the reaction of hydrogen cyanide and nitrogen dioxide at elevated temperatures, as previously described.

In order to illustrate the invention, a mixture of ethane and cyanogen in the mol ratio of ethane to cyanogen of 4.43, was passed through a Vycor tube packed with ¼" Berl saddles heated to a temperature of 800° C. The Vycor tube was made of high-silica glass, and was heated by means of an electrical furnace. The tube used in this experiment was 12" long with an outside diameter of ⅞" and a volumetric capacity of 92 cc. The product gases were passed through a water condenser, followed by Dry Ice-acetone traps and a wet-test meter. Gas samples of the charge and product gases were taken and analyzed by a mass spectrometer. Product gas samples were taken between the Dry Ice-acetone traps and the wet-test meter. The material collected in the traps was analyzed chemically for cyanide ion and acrylonitrile. The data obtained on this run appears in the following table.

Table 1

| | |
|---|---|
| Temperature of run (° C.) | 800 |
| Duration of run (minutes) | 60 |
| Mol ratio of $C_2H_6/(CN)_2$ | 4.43 |
| GHSV of charge gas | 256 |
| Percent conversion of $C_2H_6$ | 50.0 |
| Percent conversion of $(CN)_2$ | 31.6 |
| Yield per pass of $CH_2=CHCN$ (based on $(CN)_2$) | 19.0 |
| Selectivity for $CH_2=CHCN$ (based on $(CN)_2$) | 60.0 |
| Yield per pass of ethylene (based on $C_2H_6$) | 37.3 |
| Selectivity for ethylene (based on $C_2H_6$) | 74.6 |

NOTE.—GHSV = Gaseous hourly space velocity; i. e., volumes of gas measured at standard temperature and pressure per hour per unit volume of reaction space. Yield per pass = mols of product formed, expressed as a percent of the mols of one of the reactants charged. Selectivity = Quantity of limiting reactant which goes to form the desired product, expressed as a percent of the quantity of the limiting reactant consumed.

From an inspection of the data in the foregoing table, it is evident that good yields of acrylonitrile and ethylene were obtained and that the selectivity for acrylonitrile and ethylene based on cyanogen and ethane, respectively, were exceptionally good.

Additional runs were made using the same reactor except that the reactor was not packed with Berl saddles. For purposes of comparison, two runs were made without cyanogen and two were made with cyanogen to determine the effect of cyanogen on ethylene formation. The conditions under which the runs were carried out and the results obtained are set forth in Table II.

Table II

| Run No. | 2 | 3 | 4 | 5 |
|---|---|---|---|---|
| Temperature (° C.) | 853 | 850 | 800 | 800 |
| GHSV | 1,000 | 990 | 235 | 240 |
| Duration of run (minutes) | 25 | 30 | 22 | 30 |
| Mol ratio of $C_2H_6/(CN)_2$ | | 7.56 | | 1.94 |
| Percent conversion of $C_2H_6$ | 56.8 | 59.3 | 60.9 | 68.7 |
| Percent conversion of $(CN)_2$ | | 61.1 | | 63.3 |
| Yields per Pass: | | | | |
| $C_2H_4$ (based on $C_2H_6$) | 47.0 | 47.6 | 44.4 | 51.0 |
| $CH_4$ (based on $C_2H_6$) | 6.0 | 6.4 | 8.7 | 11.8 |
| $H_2$ (based on $C_2H_6$) | 50.5 | 49.6 | 49.8 | 45.7 |
| $CH_2{=}CHCN$ (based on $(CN)_2$) | | 25.9 | | 19.9 |
| $CH_3CN$ (based on $(CN)_2$) | | 7.8 | | 7.1 |
| HCN (based on $(CN)_2$) | | 90.8 | | 86.0 |
| Selectivities: | | | | |
| $C_2H_4$ (based on $C_2H_6$ consumed) | 82.8 | 80.2 | 73.0 | 74.2 |
| $CH_4$ (based on $C_2H_6$ consumed) | 10.6 | 10.7 | 14.3 | 17.2 |
| $H_2$ (based on $C_2H_6$ consumed) | 89.0 | 87.0 | 82.0 | 66.6 |
| $CH_2{=}CHCN$ (based on $(CN)_2$ consumed) | | 42.5 | | 34.9 |
| $CH_3CN$ (based on $(CN)_2$ consumed) | | 12.5 | | 11.2 |
| HCN (based on $(CN)_2$ consumed) | | 148.5 | | 135.0 |

The conclusions reached from these runs are (1) the Berl saddles do not appear to have any effect on the reaction and (2) cyanogen, while having little or no effect on the selectivity of the reaction to produce ethylene from ethane, increases the yield per pass of ethylene, and (3) the selectivity for acrylonitrile conversion appears to be higher at the higher temperature and space velocity as shown by a comparison of runs 3 and 5.

In the runs listed in Table II the gas samples of the product gases were taken before the gases entered the Dry Ice trap and were analyzed by mass spectrometric analysis to give a complete and accurate picture of the composition of the product gas. No chemical analyses were used.

The ethylene produced in the process, as previously pointed out, can be used in the synthesis of other chemicals; or, if desired, it may be recycled to the process in admixture with fresh ethane for conversion to further quantities of acrylonitrile; or it may be reacted with cyanogen in a separate step to form additional quantities of acrylonitrile in accordance with the process set forth in aforementioned application Serial No. 555,772.

In carrying out the foregoing process of producing acrylonitrile and ethylene by reaction of ethane and cyanogen, any type of reactor may be used which is resistant to corrosion by the reaction materials and which is capable of withstanding the temperatures utilized in the reaction, such as Vycor glass, stainless steel or other metal type of reactor lined with refractory material.

It will be seen, therefore, that we have provided a simple method for preparing acrylonitrile and ethylene simultaneously from a cheap, raw material, namely, ethane. Although we prefer substantially pure ethane as charging material for the process in order to avoid as far as possible production of undesirable by-products, we may use commercial grades of ethane containing small amounts of propane, butane, and methane.

We claim:

1. The method of producing acrylonitrile comprising reacting ethane and cyanogen at a temperature sufficiently high to induce reaction between the ethane and cyanogen.

2. Method in accordance with claim 1 in which the temperature is about 700–1000° C.

3. Method in accordance with claim 2 in which the mol ratio of ethane to cyanogen is 1 to 20 of the former to 20 to 1 of the latter.

4. Method in accordance with claim 3 in which the space velocity is between 100 and 2000.

5. The method of preparing acrylonitrile and ethylene comprising subjecting a mixture of ethane and cyanogen to a temperature of about 750–900° C. in a reaction zone, cooling the reaction mixture to a temperature sufficiently low to condense acrylonitrile, recovering acrylonitrile from the condensation product and recovering ethylene from the reaction gas.

6. Method in accordance with claim 5 in which the temperature is about 850° C.

7. Method in accordance with claim 6 in which the mol ratio of ethane to cyanogen is between 2 and 10 to 1.

8. Method in accordance with claim 7 in which the space velocity is about 1000.

9. The method of preparing acrylonitrile and ethylene comprising reacting ethane and cyanogen at a temperature sufficiently elevated to produce acrylonitrile and hydrogen cyanide, separating hydrogen cyanide from the reaction products, converting the separated hydrogen cyanide to cyanogen and recycling the last-mentioned cyanogen for reaction with further quantities of ethane.

10. Method in accordance with claim 9 in which the temperature is between 750 and 900° C.

References Cited in the file of this patent

UNITED STATES PATENTS 2,642,454    Mahan et al. _____ June 16, 1953
2,745,864    Dixon _____ May 15, 1956

OTHER REFERENCES

Janz: Jour. Am. Chem. Soc. vol. 74, pgs. 4529–31 (1952.)